INVENTORS.
WILLIAM O. TAIT
BY NORMAN A. WILKES

ATTORNEY

United States Patent Office 3,114,405
Patented Dec. 17, 1963

3,114,405
CAPTIVE FASTENER WITH SHOULDER TO PREVENT ENGAGEMENT OF THE SCREW HEAD WITH THE WORK
William O. Tait, Locust Valley, and Norman A. Wilkes, Plainview, N.Y., assignors to Reeves Instrument Corporation, Garden City, N.Y., a corporation of New York
Original application Nov. 23, 1956, Ser. No. 624,071, now Patent No. 2,967,557, dated Jan. 10, 1961. Divided and this application Nov. 23, 1960, Ser. No. 71,214
3 Claims. (Cl. 151—69)

This application is a division of application Serial No. 624,071, filed November 23, 1956, now Patent 2,967,557.

This invention relates to fastening devices, and more particularly to fasteners of the captivated type.

Captive fasteners are often used to secure electrical assemblies or units within a housing or supporting frame. These units generally consist of a metal chassis on which electrical and mechanical components are mounted and a front panel attached to one side of the chassis. These assemblies may be installed within the housing or supporting frame by providing guides attached to each side of the chassis which cooperate with guides located within the supporting frame. The assemblies are slid into the supporting frame upon these guides. The fasteners are usually attached to the front panel near each side for engaging with suitable receptacles affixed to the supporting frame. When the front panel is moved into position against the supporting frame, it is important that the fasteners be properly aligned so they will not be damaged by striking the frame or mating receptacles. Fasteners for this application should be easily operated by hand, should not mar the exposed surface of the front panel, and should be readily removable from the panel without damaging either the fastener or the panel.

In one type of prior art fastener the engaging element or stud is maintained perpendicular to the panel by a retaining cup which completely surrounds the stud. This cup, while keeping the stud in the desired position for engagement with the receptacle, prevents operation of the fastener without a screw driver or other tool. The fastener is usually secured to the panel by inserting it in an opening in the panel and then flaring over the lower part of the cup. Removal of the stud is prevented by flaring the top of the cup over the head of the stud. Such fasteners cannot be readily removed from the panel and require the use of special tools in their assembly.

Other known captivated fasteners provide an accessible knurled knob to permit rotation by hand. Such fasteners, however, generally permit the rotated element to bear against the panel or other stationary surface when the fastener is engaged, thereby scratching or otherwise marring the exposed panel surface after prolonged use. Furthermore, fasteners of this type are not provided with means for maintaining their alignment normal to the panel surface when they are disengaged from their receptacle. A panel member having a plurality of such fasteners is not readily attached to a cabinet, and considerable difficulty is often encountered in the alignment of all of the fasteners with their receptacles.

In accordance with our invention, a fastener is provided which has its longitudinal axis maintained normal to the panel member by a spring surrounding the stud. The spring is held in compression between a cap attached to the shank of the stud and a cylindrical member, the cylindrical member telescoping inside the cap. The stud is provided with two sections of different diameters for forming a step for abutting and holding the panel member rigidly against a supporting frame. The fastener is assembled and secured to the panel member by means of a simple retaining ring which may be readily removed and does not require the use of special tools for installation.

It is a principal object of this invention to provide an improved fastening device which, when disengaged, is positioned with its axis substantially normal to the panel member to which it is secured.

Another object is to provide a fastener that is relatively simple, attractive in appearance, and whose operation does not mar the exposed portion of the panel to which it is attached.

A further object is to provide a fastener which may be moved into exact alignment with its receptacle without damaging either the fastener or receptacle.

Other objects and advantages of the invention will be apparent from the following description, the appended claims, and the drawing of which:

Figure 2:
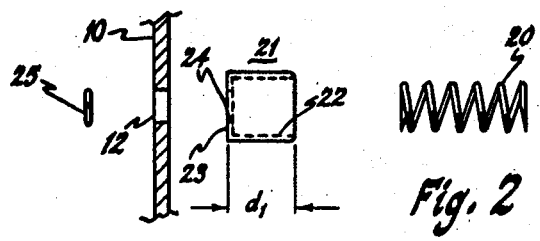
FIGS. 1–3 illustrate three views of the improved fastener described in applicants' Patent 2,967,557.
Figure 2:
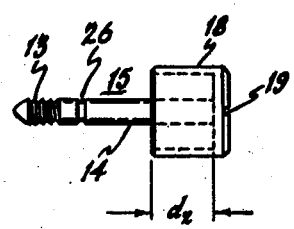
Figure 1:
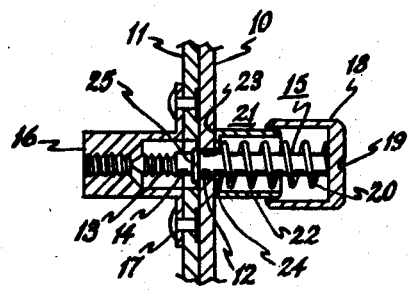
Figure 3:
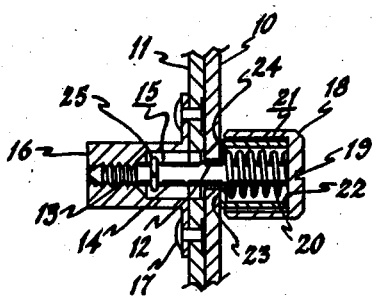

The fastener illustrated in FIGS. 1–3 comprises a stud 15 attached to a hollow cap 18, a spring 20, a sleeve 21, and a retaining ring 25. The fastener is assembled to a panel member 10 by inserting the threaded end portion 13 of stud 15 through aperture 12 of panel 10 and affixing retaining ring 25 in groove 26.

In order to join panel 10 to side wall 11 of the supporting frame the panel is brought into alignment with and touching the supporting frame, and the threaded portion of stud 15 is inserted in the unthreaded portion of receptacle 16. Any small mis-alignment that may exist between the fastener and the receptacle may be compensated for by moving the fastener laterally in aperture 12 of panel 10, the aperture being made large enough to permit some lateral displacement of stud 15. Since the fastener is held in substantially the correct position by helical spring 20, it cannot be jammed between the panel and side wall. Moreover, spring 20 permits some angular movement of stud 15 and the stud can be moved into alignment with receptacle 16 without damaging the threads of either the stud or the receptacle. The threaded portion 13 of stud 15 is engaged with the threaded portion of receptacle 16 by pressing cap 18 toward the panel and rotating the cap.

Figure 4:
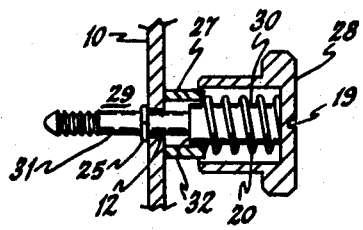
FIG. 4 is a side view partially in section of the modified form of our fastener described and claimed in this application.

FIG. 4 shows the embodiment of this invention. In this form the annular cup is replaced by a cylindrical member 27 which surrounds the stud and is positioned between panel member 10 and helical spring 20. The cylindrical member 27 is of sufficient length to assure that the open end of cylindrical cap 28 will overlap it when the stud is fully disengaged from its receptacle. Stud 29 comprises two sections of different diameters. Stud section 30, having the greater diameter, is surrounded by spring 20 and the upper part of cylindrical member 27. The other section 31 of stud 29 passes through aperture 12 in panel 10. Step 32 resulting from the change in diameter of stud 29 is located outside of hollow cap 28 so that when the fastener is fully engaged with its receptacle, step 32 will bear against the front surface of panel member 10, thereby preventing contact of the edge of cap 28 with the panel.

Figure 5:
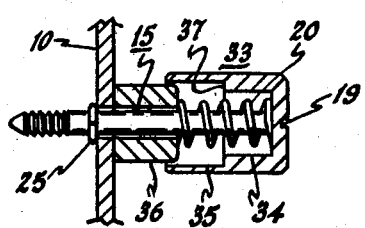
FIG. 5 is a side view partially in section of another form of the fastener described in applicants' Patent 2,967,557.

In the fastener illustrated in FIG. 5, the hollow cylindrical cap 33 comprises two portions, the portion 34 adjacent to the closed end having a smaller inner diameter than the other portion 35. When the fastener is engaged, the annular member 36 telescopes within the portion of the hollow cap having the larger inner diameter and rests against step 37 which results from the change in inner diameter of the cap. The length of annular member 36 is made greater than the distance between the open end of portion 35 of cap 33 and step 37 to prevent contact of the edge of the cap with the front surface of the panel when the fastener is fully engaged.

Figure 6:
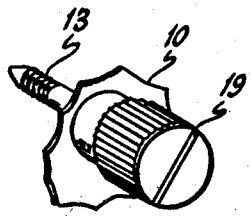
FIG. 6 is a perspective view of the fastener attached to a panel member.

FIG. 6 is a perspective view of the fastener which is typical of all of the forms presented since the outward appearance of each embodiment is almost identical. The knurled cap is easily rotated by hand and when pressed in toward the panel is prevented from marring the panel surface by one of the means previously described. The annular member or sleeve conceals the spring and stud, thus contributing to the attractive appearance of the fastener while providing a bearing surface against the panel.

The fastener components may be held together before installation in the panel member by the same retaining ring that is used to secure the fastener to the panel after installation. The retaining ring would, of course, be removed prior to insertion of the stud in the panel aperture and then replaced after insertion of the stud.

The fastener is easily manufactured, assembled, and attached to the panel member. Since simple retaining means may be used, flaring or similar operations which would make it difficult if not impossible to remove the fastener from the panel without damage are eliminated. When a number of fasteners are used to attach a panel to a supporting frame no difficulty is encountered in engaging them simultaneously since each of the fasteners is prealigned and may be moved smoothly into its receptacle.

As many changes could be made in the above construction and many different embodiments of this invention could be made without departing from the scope thereof, it is intended that all matter contained in the above description or shown in the accompanying drawing shall be interpreted as illustrative and not in a limiting sense.

What is claimed is:

1. A captive fastener adapted for rigidly attaching a panel member to a supporting frame, said supporting frame including receptacle means for engaging said fastener, comprising in combination, a hollow cap having an open end and a closed end, a stud having first and second portions of different diameters, the stud portion having the larger diameter being directly attached to the inner surface of the closed end of said hollow cap, the stud portion having the smaller diameter extending outside said hollow cap, the length of the larger diameter portion of said stud being slightly longer than the depth of said hollow cap, helical spring means situated within said hollow cap and surrounding the larger diameter portion of said stud, a cylindrical member having a uniform outer diameter surrounding the larger diameter portion of said stud and telescoping within said hollow cap, said cylindrical member compressing said helical spring between the inner surface of the closed end of said hollow cap and one end of said cylindrical member by the insertion of the smaller diameter portion of said stud through an aperture in said panel member, the aperture in said panel member being larger than the smaller diameter portion of said stud and smaller than the larger diameter portion of said stud, the other end of said cylindrical member abutting directly against the front surface of said panel member, retaining means attached to and carried by the smaller diameter portion of said stud at a fixed position thereon, said retaining means having a portion protruding from said stud and abutting directly against the rear surface of said panel member for holding the fastener captive to said panel member when the fastener is disengaged, the length of said helical spring means being sufficient to exert a force between the inner surface of the closed end of said hollow cap and said cylindrical member to maintain the other end of said cylindrical member directly against the front surface of said panel when the fastener is disengaged, and engaging means affixed near the end of the smaller diameter portion of said stud for engaging said receptacle means, said engaging means being adapted to engage said receptacle means upon rotation of said fastener for advancing the step resulting from the change in diameter of said stud firmly against the front surface of said panel to rigidly hold said panel member against said supporting frame.

2. The captive fastener as defined by claim 1 wherein the length of said cylindrical member is greater than the distance between the open end of said hollow cap and the front surface of said panel member when the fastener is disengaged.

3. The captive fastener as defined by claim 1 wherein said engaging means affixed near the end of the smaller diameter portion of said stud comprises a threaded region.

References Cited in the file of this patent

UNITED STATES PATENTS

| | | |
|---|---|---|
| 1,419,974 | McLaughlin | June 20, 1922 |
| 2,826,231 | Alden | Mar. 11, 1958 |

FOREIGN PATENTS

| | | |
|---|---|---|
| 534,439 | England | Mar. 6, 1941 |